(12) United States Patent
Saka et al.

(10) Patent No.: US 10,780,781 B2
(45) Date of Patent: Sep. 22, 2020

(54) DISPLAY DEVICE FOR VEHICLE

(71) Applicant: HONDA MOTOR CO., LTD., Minato-ku, Tokyo (JP)

(72) Inventors: Tasuku Saka, Wako (JP); Nobuya Nishimura, Wako (JP); Tomohisa Manabe, Wako (JP); Kazufumi Kuroda, Wako (JP); Hiroshi Sugihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/371,218

(22) Filed: Apr. 1, 2019

(65) Prior Publication Data

US 2019/0308501 A1    Oct. 10, 2019

(30) Foreign Application Priority Data

Apr. 6, 2018    (JP) .................................. 2018-074142

(51) Int. Cl.
*B60K 35/00* (2006.01)
*G06F 3/048* (2013.01)

(52) U.S. Cl.
CPC .............. *B60K 35/00* (2013.01); *G06F 3/048* (2013.01); *B60K 2370/1434* (2019.05);
(Continued)

(58) Field of Classification Search
CPC ................ B60K 35/00; B60K 2370/52; B60K 2370/143; B60K 2370/152;
(Continued)

(56) References Cited

U.S. PATENT DOCUMENTS

| | | | | |
|---|---|---|---|---|
| 8,587,546 | B1 * | 11/2013 | El-Khoury | G06F 3/1431 |
| | | | | 345/173 |
| 2004/0026947 | A1 * | 2/2004 | Kitano | B60R 7/04 |
| | | | | 296/24.34 |

(Continued)

FOREIGN PATENT DOCUMENTS

JP    2013-154713    8/2013

*Primary Examiner* — Michael J Eurice
(74) *Attorney, Agent, or Firm* — Amin, Turocy & Watson, LLP

(57) ABSTRACT

A display device (100) for a vehicle includes: a plurality of display units (170, 180) which are mounted in the vehicle; an operation unit (110) that is configured to accept an operation of selecting content that is displayed on some or all of the plurality of display units; a determination unit (120) that determines a sitting position of a person who operates the operation unit; and a display control unit (130) that is configured to cause any one of the plurality of display units to display content on the basis of an operation that is accepted by the operation unit and a determination result of the determination unit. In a state in which content is displayed on any one of the plurality of display units, in a case where an operation of performing display of new content is accepted by the operation unit, the display control unit is configured to change a display aspect of the content that is already displayed on the basis of a determination result of the sitting position by the determination unit.

22 Claims, 7 Drawing Sheets

(52) U.S. Cl.
CPC .. *B60K 2370/152* (2019.05); *B60K 2370/182* (2019.05); *B60K 2370/195* (2019.05); *B60K 2370/197* (2019.05); *B60K 2370/52* (2019.05); *B60K 2370/741* (2019.05)

(58) Field of Classification Search
CPC ........ B60K 2370/154; B60K 2370/182; B60K 2370/184; B60K 2370/195; B60K 2370/197; B60K 2370/741; B60K 2370/1434; B60K 2370/1438; G06F 3/048; G06F 3/0484; G06F 1/3265; G06F 1/3231; G06F 3/1423; G09G 2380/10
See application file for complete search history.

(56) References Cited

U.S. PATENT DOCUMENTS

| | | | |
|---|---|---|---|
| 2007/0101290 A1* | 5/2007 | Nakashima | G01C 21/3626 715/797 |
| 2012/0218295 A1* | 8/2012 | Hashikawa | B60K 35/00 345/629 |
| 2014/0292047 A1* | 10/2014 | Boyer, Jr. | H04N 7/17318 297/217.4 |
| 2014/0327533 A1* | 11/2014 | Ueda | B60K 35/00 340/438 |
| 2015/0233721 A1* | 8/2015 | Kiso | G06T 11/60 345/629 |
| 2016/0280068 A1* | 9/2016 | Oku | B60R 11/02 |
| 2017/0364148 A1* | 12/2017 | Kim | B60K 37/06 |
| 2018/0129467 A1* | 5/2018 | Gage | G06F 3/1454 |
| 2018/0194227 A1* | 7/2018 | Gussen | B60K 35/00 |
| 2018/0370365 A1* | 12/2018 | Lee | B60K 37/02 |
| 2019/0065021 A1* | 2/2019 | Digman | G06F 3/0488 |
| 2019/0196679 A1* | 6/2019 | You | G06F 3/04817 |
| 2019/0286292 A1* | 9/2019 | Tsubone | G06F 3/0484 |

* cited by examiner

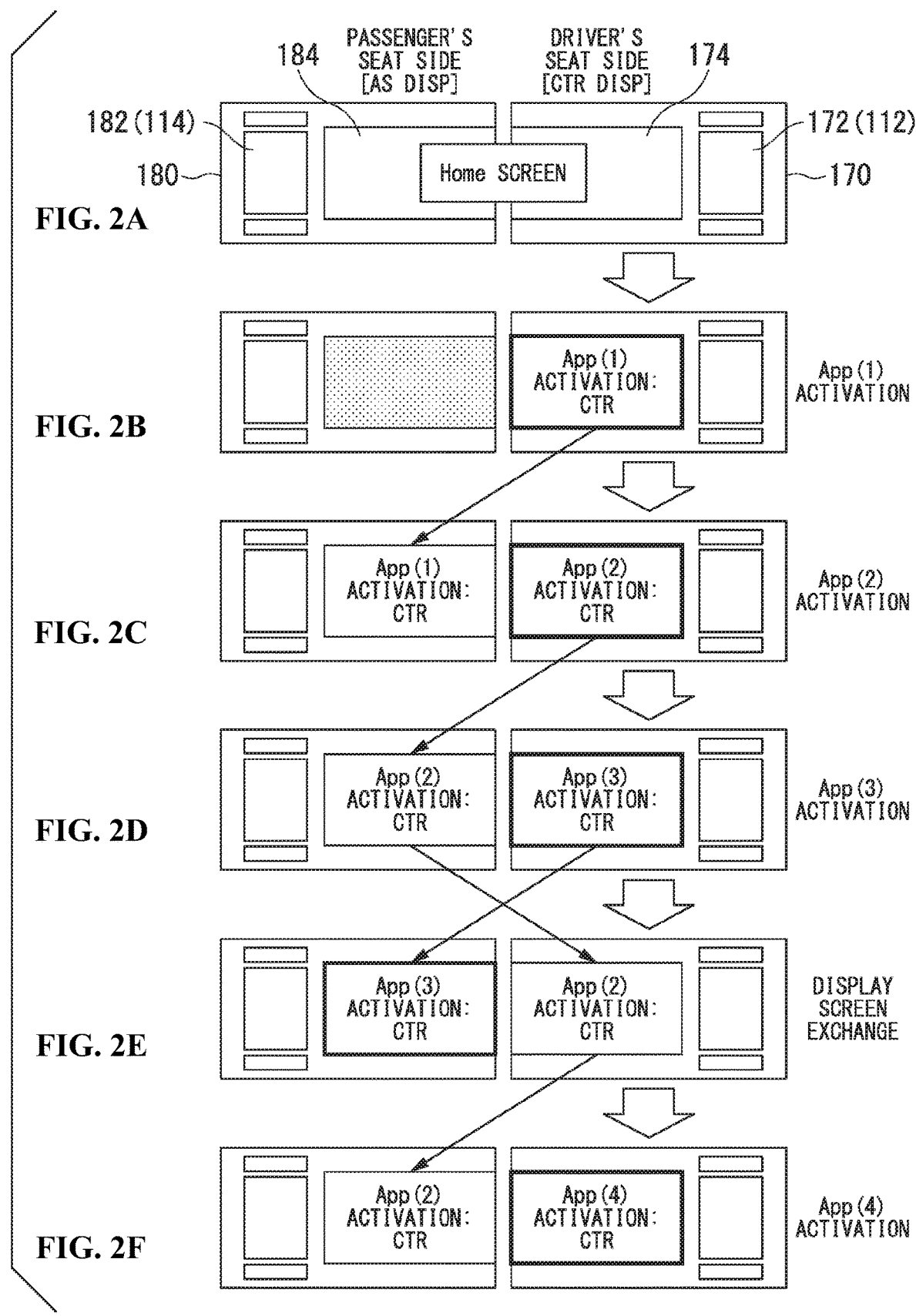

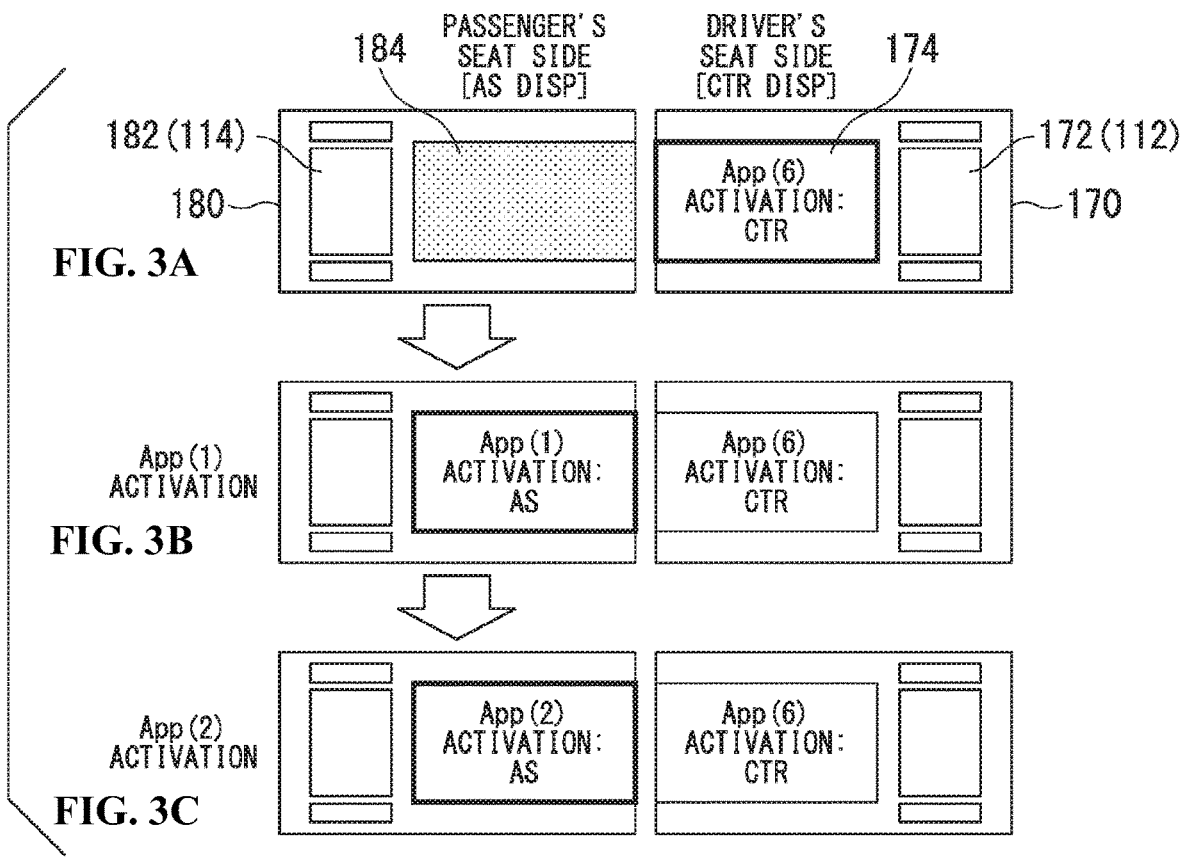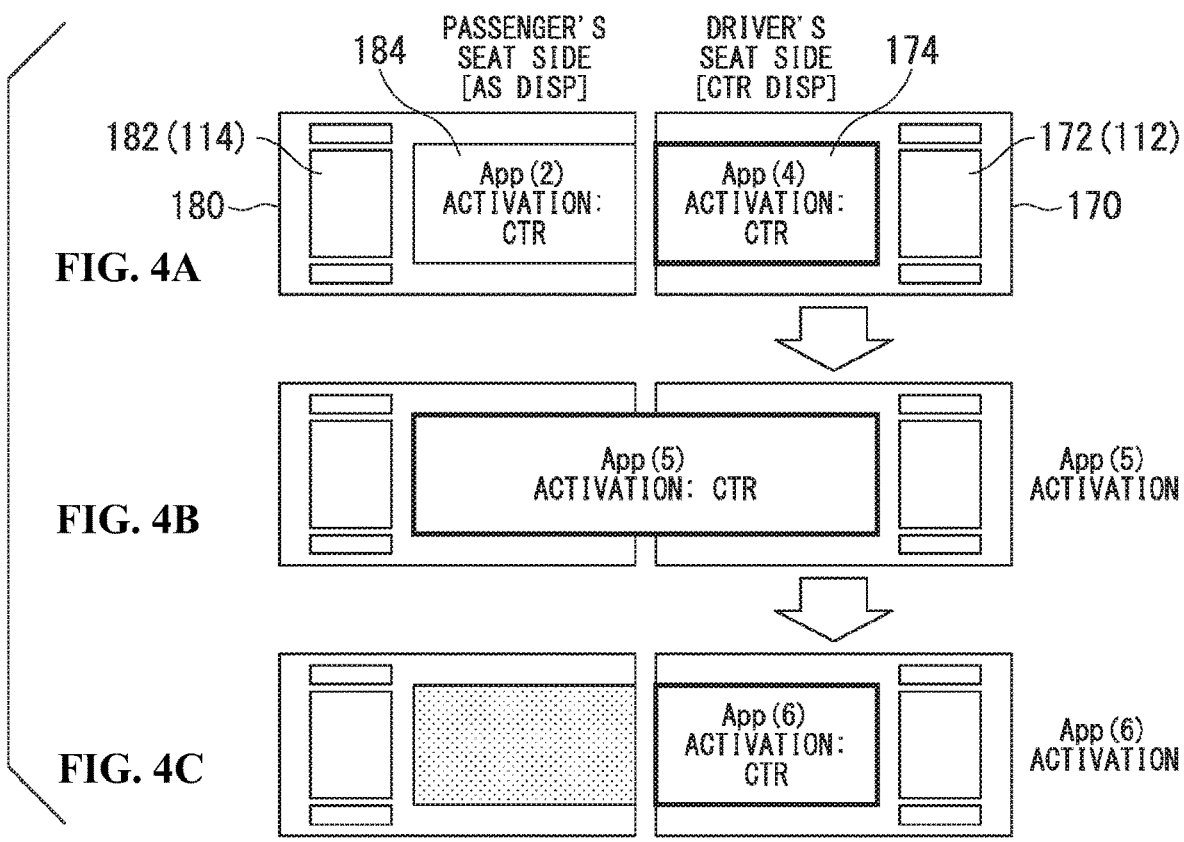

DISPLAY DEVICE FOR VEHICLE

CROSS-REFERENCE TO RELATED APPLICATION

Priority is claimed on Japanese Patent Application No. 2018-074142, filed Apr. 6, 2018, the content of which is incorporated herein by reference.

BACKGROUND OF THE INVENTION

Field of the Invention

The present invention relates a display device for a vehicle.

A technology of causing respective display units to display different content on the basis of an occupant's operation in a case where the plurality of display devices are mounted in a vehicle is known (for example, refer to Japanese Unexamined Patent Application Publication No. 2013-154713).

SUMMARY OF THE INVENTION

However, in the technology of the related art, in a state in which content is displayed on a display unit on driver's seat side, an operation of causing the display unit on the driver's seat side to display new content by an occupant in a passenger's seat side may be accepted, and thus content necessary for the driver may not be displayed on the display unit on the driver's seat side. According to this, in the technology of the related art, convenience for the driver may deteriorate.

The invention has been made in consideration of such circumstances, and an object thereof is to provide a display device for a vehicle which is capable of improving convenience for a driver by flexibly changing a display aspect.

A display device for a vehicle according to the invention employs the following configurations.

(1) According to an aspect of the invention, there is provided a display device for a vehicle. The display device includes: a plurality of display units which are mounted in the vehicle; an operation unit that is configured to accept an operation of selecting content that is to be displayed on some or all of the plurality of display units; a determination unit that is configured to determine a sitting position of a person who operates the operation unit; and a display control unit that is configured to cause any one of the plurality of display units to display content on the basis of an operation that is accepted by the operation unit and a determination result of the determination unit. In a state in which content is displayed on any one of the plurality of display units, in a case where an operation of performing display of new content is accepted by the operation unit, the display control unit is configured to change a display aspect of the content that is already displayed on the basis of a determination result of the sitting position by the determination unit.

(2) In the aspect of (1), the plurality of display units may be configured to include a first display unit that is disposed on a driver's seat side and a second display unit that is disposed on a passenger's seat side in parallel to the first display unit, the determination unit may be configured to determine whether the sitting position of the person who operates the operation unit is the driver's seat or the passenger's seat, and in a state in which content is displayed on any one of the first display unit and the second display unit, in a case where an operation of performing display of new content is accepted by the operation unit, the display control unit may be configured to determine whether or not to move the content that is already displayed between the display units on the basis of a determination result by the determination unit.

(3) In the aspect of (2), in a state in which content is displayed on any one of the first display unit and the second display unit, in a case where an operation of performing display of new content is accepted by the operation unit, the display control unit may be configured to move the content that is already displayed on the first display unit from the first display unit to the second display unit in a case where the determination unit determines that the sitting position is the driver's seat, and the display control unit may be configured not to move the content that is already displayed on the second display unit from the second display unit to the first display unit in a case where the determination unit is configured to determine that the sitting position is the passenger's seat.

(4) In the aspect of (1), the plurality of display units may be configured to include a first display unit that is disposed on a driver's seat side and a second display unit that is disposed on a passenger's seat side in parallel to the first display unit, the determination unit may be configured to determine whether the sitting position of the person who operates the operation unit is the driver's seat or the passenger's seat, and in a state in which content is displayed on any one of the first display unit and the second display unit, in a case where an operation of performing display of new content is accepted by the operation unit, the display control unit may be configured to determine whether or not to restrict display of the content that is already displayed on the basis of a determination result by the determination unit.

(5) In the aspect of (4), in a state in which content is displayed on any one of the first display unit and the second display unit, in a case where an operation of performing display of new content is accepted by the operation unit, the display control unit may be configured not to restrict display of the content that is already displayed on the first display unit in a case where the determined unit is configured to determine that the sitting position is the driver's seat, and the display control unit may be configured to stop display of the content that is already displayed on the second display unit or may be configured to reduce a display region in a case where the determination unit is configured to determine that the sitting position is the passenger's seat.

(6) In the aspect of (1), in a case where an operation of causing the plurality of display units to display one piece of content is accepted in the operation unit, the display control unit may be configured to cause the plurality of display units to display the one piece of content as one display unit.

(7) In the aspect of (6), the operation of causing the plurality of display units to display the one piece of content by the operation unit may be accepted only from a person who sits in a driver's seat.

(8) In the aspect of (6), in a state in which the one piece of content is displayed on the plurality of display units as one display unit, in a case of accepting an operation of displaying new content on some display units among the plurality of display units, the display control unit may be configured to stop display of the one piece of content or may reduce a display region, and displays the new content on the some display units.

(9) In the aspect of (8), the operation of displaying new content on some display units among the plurality of display units may be accepted only from a person who sits in a driver's seat.

(10) In the aspect of (1), the plurality of display units may be constructed by dividing a display region on one screen, and in a state in which content is displayed on any one of the plurality of display units, in a case where an operation of performing display of new content is accepted by the operation unit, the display control unit may be configured to determine whether or not to perform display by changing a display region of the content that is already displayed on the basis of a determined result of the determination unit.

(11) According to another aspect of the invention, there is provided a display device for a vehicle. The display device includes: a plurality of display units which are mounted in the vehicle; an operation unit including a first operation unit on a driver's seat side and a second operation unit on a passenger's seat side, the first and second operation units accepting an operation of selecting content that is to be displayed on some or all of the plurality of display units; and a display control unit that is configured to cause any one of the plurality of display units to display content on the basis of an operation that is accepted by the operation unit. In a state in which content is displayed on any one of the plurality of display units, the display control unit is configured to change a display aspect of the content that is already displayed in correspondence with operation content of any one of an operation of performing display of content which is accepted by the first operation unit and an operation of performing display of content which is accepted by the second operation unit.

(12) In the aspect of (11), the plurality of display units may include a first display unit that is disposed on the driver's seat side and a second display unit that is disposed on a passenger's seat side in parallel to the first display unit, and in a state in which content is displayed on any one of the first display unit and the second display unit, in a case where an operation of performing display of new content is accepted by the operation unit, the display control unit may be configured to determine whether or not to move the content that is already displayed between the display units on the basis of the operation content.

(13) In the aspect of (12), in a state in which content is displayed on any one of the first display unit and the second display unit, in a case where an operation of performing display of new content is accepted by the operation unit, the display control unit may move the content that is already displayed on the first display unit from the first display unit to the second display unit in a case where the operation is accepted in the first operation unit, and the display control unit may be configured not to move the content that is already displayed on the second display unit from the second display unit to the first display unit in a case where the operation is accepted in the second operation unit.

(14) In the aspect of (11), the plurality of display units may include a first display unit that is disposed on a driver's seat side and a second display unit that is disposed on a passenger's seat side in parallel to the first display unit, and in a state in which content is displayed on any one of the first display unit and the second display unit, in a case where an operation of performing display of new content is accepted by the operation unit, the display control unit may be configured to determine whether or not to restrict display of the content that is already displayed on the basis of the operation content.

(15) In the aspect of (14), in a state in which content is displayed on any one of the first display unit and the second display unit, in a case where an operation of performing display of new content is accepted by the operation unit, the display control unit may be configured not to restrict display of the content that is already displayed on the first display unit in a case where the operation is accepted by the first operation unit, and the display control unit may be configured to stop display of the content that is already displayed on the second display unit or may be configured to reduce a display region in a case where the operation is accepted by the second operation unit.

(16) In the aspect of (11), in a case where an operation of causing the plurality of display units to display one piece of content is accepted in the operation unit, the display control unit may be configured to cause the plurality of display units to display the one piece of content as one display unit.

(17) In the aspect of (16), the operation of causing the plurality of display units to display the one piece of content may be accepted only by the first operation unit.

(18) In the aspect of (16), in a state in which the one piece of content is displayed on the plurality of display units as one display unit, in a case of accepting an operation of displaying new content on some display units among the plurality of display units, the display control unit may be configured to stop display of the one piece of content or may reduce a display region, and may display the new content on the some display units.

(19) In the aspect of (18), the operation of displaying new content on some display units among the plurality of display units may be accepted only by the first operation unit.

(20) In the aspect of (11), the plurality of display units may be constructed by dividing a display region on one screen, and in a state in which content is displayed on any one of the plurality of display units, in a case where an operation of performing display of new content is accepted by the operation unit, the display control unit may be configured to determine whether or not to perform display by changing a display region of the content that is already displayed on the basis of the operation content.

According to the aspects of (1) to (20), it is possible to improve convenience for a driver by causing a display aspect to vary flexibly.

According to the aspects of (4) and (14), display necessary for driving of the driver is prevented from being changed, and thus convenience in driving is improved for the driver.

According to the aspects of (6) to (10), and (11) to (20), in one display unit that is configured to display content, it is possible to realize a display aspect in which convenience for the driver is improved.

BRIEF DESCRIPTION OF THE DRAWINGS

FIGS. 2A to 2F are views showing an example of screen transition of a first display unit and a second display unit by an operation on a driver's seat side;

FIGS. 3A to 3C are views showing an example of screen transition of the first display unit and the second display unit by an operation on a passenger's seat side;

FIGS. 4A to 4C are views showing an example of screen transition including a state in which one piece of content is displayed on the first display unit and the second display unit;

DETAILED DESCRIPTION OF THE INVENTION

Hereinafter, embodiments of a display device for a vehicle according to the invention will be described with reference to the accompanying drawings. The display device for a vehicle is a display device in which a plurality of display units provided in a vehicle are caused to display content.

First Embodiment

Figure 1:
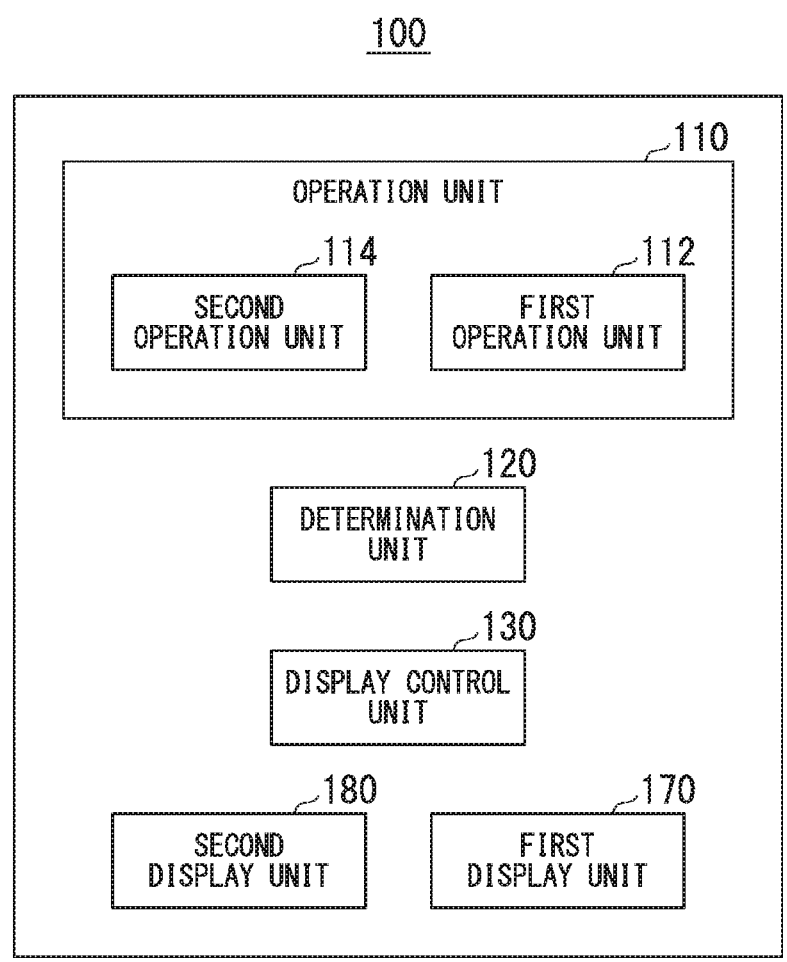
FIG. 1 is a block diagram showing a configuration of a display device for a vehicle according to a first embodiment.

FIG. 1 is a block diagram showing a configuration of the display device for a vehicle according a first embodiment. For example, a display device 100 for a vehicle includes an operation unit 110, a determination unit 120, a display control unit 130, a first display unit 170, and a second display unit 180.

The first display unit 170 and the second display unit 180 are an example of "a plurality of display units". For example, the first display unit 170 and the second display unit 180 are touch panel type display devices which are provided adjacent to each other. The first display unit 170 and the second display unit 180 may be provided in different regions of one touch panel type display device. As will be described later, the first display unit 170 is provided on a driver's seat side and the second display unit 180 is provided on a passenger's seat side.

Respective constituent elements of the operation unit 110, the determination unit 120, and the display control unit 130 are realized, for example, in a case that a hardware processor such as a central processing unit (CPU) executes a program (software). Some or all of the constituent elements may be realized by hardware (circuit unit; including a circuitry) such as a large scale integration (LSI), an application specific integrated circuit (ASIC), a field-programmable gate array (FPGA), and a graphics processing unit (GPU), or may be realized by software and hardware in cooperation. The program may be stored in a storage device such as a hard disk drive (HDD) and a flash memory in advance, or may be stored in a detachable storage medium such as a DVD and a CD-ROM and may be installed in a case that the storage medium is mounted in a drive device.

The operation unit 110 accepts an operation of selecting content to be displayed on one or both of the first display unit 170 and the second display unit 180. For example, the operation unit 110 includes a first operation unit 112 and a second operation unit 114. For example, the first operation unit 112 is a graphical user interface (GUI) switch, which is disposed in a region closer to the driver's seat, in the first display unit 170. With regard to the first operation unit 112, for example, switches such as a selection button and a dial are generated as an image.

For example, an operation region that displays the GUI switch is displayed on the first operation unit 112 (refer to FIG. 2A). For example, in the operation region, an operator that accepts an operation such as an operation of selecting content and an operation of changing a display unit on which the content is displayed is generated as an image.

For example, the second operation unit 114 is a GUI switch that is disposed in a region closer to a passenger's seat in the second display unit 180. With regard to the second operation unit 114, as in the first operation unit 112, switches such as a selection button and a dial are generated as an image.

The determination unit 120 determines a sitting position of a person who operates the operation unit 110. For example, in a case where an operation is accepted by the first operation unit 112, the determination unit 120 determines that the sitting position of the operating person is the driver's seat. For example, in a case where an operation is accepted by the second operation unit 114, the determination unit 120 determines that the sitting position of the operating person is the passenger's seat.

The display control unit 130 generates (or acquires) content including a display image, and causes any one or both of the first display unit 170 and the second display unit 180 to display the content on the basis of an operation that is accepted by the operation unit 110, and a determination result of the determination unit 120.

In a state in which content is displayed on any one of the first display unit 170 and the second display unit 180, in a case where an operation of performing display of new content is accepted by the operation unit 110, the display control unit 130 changes an display aspect of the content that is already displayed on the basis of a determination result of the sitting position by the determination unit 120. Changing of the display aspect includes changing of a display position, stoppage of display, enlargement or reduction of a display region, and the like. For example, the display control unit 130 determines whether or not to restrict display of the content that is already displayed on the basis of the determination result by the determination unit 120, and causes one or both of the first display unit 170 and the second display unit 180 to display new content. In a case where there is content that is already displayed on any one display unit between the first display unit 170 and the second display unit 180, the display control unit 130 determines whether or not to move the content between the display units.

The first display unit 170 is a display device that is provided on the driver's seat side or at the center in a dashboard inside the vehicle. For example, an image display region that displays an image of content such as an image and information, and an operation region (the first operation unit 112) that accepts an operation of changing content that is displayed on the display unit may be provided in the first display unit 170 (refer to FIGS. 2A to 2F).

The second display unit 180 is a display device that is provided on the passenger's seat side inside the vehicle. The second display unit 180 is provided in parallel to the first display unit 170. The first display unit 170 and the second display unit 180 are provided on approximately the same plane in the depth direction, but there is no limitation thereto. For example, an image display region that displays an image of content such as an image and information, and an operation region (the second operation unit 114) that accepts an operation of changing content that is displayed on the display unit may be provided in the second display unit 180 (refer to FIGS. 2A to 2F).

In a case of a right-sided steering wheel vehicle, the second display unit 180 is disposed on a left side of the first display unit 170. In a case of the left-sided steering wheel vehicle, the right and the left are reversed from each other. Hereinafter, a configuration of the right-sided steering wheel vehicle will be exemplified, but a configuration of the left-sided steering wheel vehicle, the right and the left may be switched from each other.

Operation of Display Device for Vehicle

Next, an operation of the display device 100 for a vehicle will be described. FIGS. 2A to 2F are views showing an example of screen transition of the first display unit 170 and the second display unit 180 by an operation on the driver's seat side. In a state shown in FIGS. 2A to 2F, a display image including an operation region 172 and an image display region 174 is displayed in the first display unit 170. The operation region 172 functions as a first operation unit 112.

In a case of a right-sided steering wheel vehicle, the operation region 172 is disposed on the right side of the first display unit 170, and thus it is difficult for an occupant (person) who sits in the passenger's seat to operate the operation region 172. Accordingly, in a case where an operation is accepted in the operation region 172, it is estimated that a person who sits in the driver's seat has operated the operation region 172.

As in the first display unit 170, a display image including an operation region 182 and an image display region 184 is displayed on the second display unit 180. The operation region 182 functions as a second operation unit 114. As in the operation region 172, an operator is generated as an image in the operation region 182 (refer to FIG. 2A). In the case of the right-sided steering wheel vehicle, the operation region 182 is disposed on the left side of the second display unit 180, and it is difficult for an occupant who sits in the driver's seat to operate the operation region 182. Accordingly, in a case where an operation is accepted in the operation region 182, it is estimated that a person who sits in the passenger's seat has operated the operation region 182.

When accepting an operation of selecting content in the operation region 172 by an occupant (hereinafter, referred to as a first occupant) who sits in the driver's seat, the determination unit 120 determines that a sitting position of a person who has performed the operation is a driver's seat side. The display control unit 130 displays first content (App(1)) on the image display region 174 of the first display unit 170 on the basis of a determination result by the determination unit 120 (refer to FIG. 2B)).

Next, in a state in which first content is displayed on the first display unit 170, an operation of selecting second content, which is to be newly displayed, by the first occupant is accepted in the operation region 172. In this case, the determination unit 120 recognizes that the operation is accepted by the first operation unit 112, and determines that a sitting position of a person who performs the operation is the driver's seat. The display control unit 130 displays second content (App(2)) on the image display region 174 of the first display unit 170 on the basis of a determination result of the determination unit 120. At this time, the display control unit 130 determines that the first content is to be moved to the image display region 184 of the second display unit 180, and displays the first content in the image display region 184 (refer to FIG. 2C).

Next, in a state in which the first content that is already displayed is displayed in the image display region 184, and the second content is displayed in the image display region 174, an operation of selecting third content by the first occupant is accepted in the operation region 172. In this case, the determination unit 120 determines that a sitting position of a person who performs the operation is the driver's seat.

The display control unit 130 displays the third content (APP(3)) in the image display region 174 of the first display unit 170 on the basis of a determination result by the determination unit 120. At this time, the display control unit 130 determines that the second content is to be moved to the image display region 184 of the second display unit 180, and displays the second content in the image display region 184 (refer to FIG. 2(D)). In addition, the display control unit 130 stops display of the first content that is displayed on the second display unit 180.

For example, the stopping of display represents that a display image of content is not displayed on a display unit. At this time, the display control unit 130 may allow the content to operate in the background without terminating the operation of the content. For example, the operation in the background associates with the following example. In a case where the content is navigation, an image is continuously generated without being displayed on a screen. In a case where the content is television, an image received without being displayed on the screen is continuously generated. In a case where the content is a movie, a video is temporarily stopped, and initiation of reproduction is set to a stand-by state.

Next, in the operation region 172, an operation of switching display content of the first display unit 170 and display content of the second display unit 180 by the first occupant is accepted. In this case, the display control unit 130 allows display content of the first display unit 170 and display content of the second display unit 180 to be displayed after being switched from each other, and thus the second content is displayed on the first display unit 170 and the third content is displayed on the second display unit 180 (refer to FIG. 2E).

Next, in a state in which the second content is displayed on the first display unit 170, and the third content is displayed on the second display unit 180, in the operation region 172, an operation of selecting fourth content by the first occupant is accepted. In this case, the determination unit 120 determines that a sitting position of a person who performs the operation is the driver's seat.

The display control unit 130 displays the fourth content (App(4)) in the image display region 174 of the first display unit 170 on the basis of a determination result by the determination unit 120. At this time, the display control unit 130 moves the second content to the image display region 184 of the second display unit 180 (refer to FIG. 2F). In addition, the display control unit 130 stops display of the third content that is displayed in the image display region 184 of the second display unit 180.

At this time, the display control unit 130 may allow the third content to operate in the background. The display control unit 130 may allow the first content that is not displayed by the previous operation to continuously operate in the background. With regard to the content that is allowed to operate in the background, an operation of stopping the content by the first occupant may be accepted in the operation region 172.

As described above, in a case where the first operation unit 112 accepts an operation of displaying content by the first occupant, the display control unit 130 causes the first display unit 170 that is disposed on the first occupant side and is easily visible to the first occupant to display the content. According to this, according to the display device 100 for a vehicle, the content is displayed in a display aspect that is easily visible to the first occupant, and thus it is possible to improve convenience for the first occupant.

FIGS. 3A to 3C are views showing an example of screen transition of the first display unit 170 and second display unit 180 by an operation on the passenger's seat side. First, it is assumed that sixth content is displayed on the first display unit 170 and no content is displayed on the second display unit 180 (refer to FIG. 3A).

In this state, an operation of selecting the first content by an occupant (hereinafter, referred to as a second occupant) who sits in the assistant seat is accepted in the operation region 182. In this case, the determination unit 120 determines that a sitting position of a person who performs the operation is the assistant seat.

The display control unit 130 displays the first content (APP(1)) in the image display region 184 of the second display unit 180 on the basis of a determination result by the determination unit 120 (refer to FIG. 3B).

In the state in which the first content is displayed on the second display unit 180, an operation of selecting the second content by the second occupant is accepted in the operation region 182. The determination unit 120 determines that a sitting position of a person who performs the operation is the passenger's seat, and the display control unit 130 displays the second content (APP(2)) in the image display region 184 of the second display unit 180 (refer to FIG. 3C).

At this time, the display control unit 130 does not move the first content that is already displayed on the second display unit 180 to the first display unit 170, and stops the display of the first content or reduces a display region thereof. For example, the reduction of the display region represents that a size of a display image of content that is displayed on a display unit is reduced. For example, the display control unit 130 disposes the reduced display image on a lower portion or on a right side of the image display region 174. In a case where the content is a moving image, the display control unit 130 may display the moving image as the display image that is changed to be small. The display control unit 130 may allow the content of which display is stopped to operate in the background without terminating the operation of the content.

The display control unit 130 may display an icon associated with the content instead of the reduced display image. In a case where an operation of touching the reduced display image or the icon is accepted, the display control unit 130 displays the first content (App(1)) that is allowed to operate in the background in the image display region 184 of the second display unit 180. The display control unit 130 does not move the second content that is already displayed on the second display unit 180 to the first display unit 170, and stops the display of the second content or reduces a display region thereof.

For example, the display control unit 130 performs predetermined display for obtaining permission of the first occupant with respect to an operation in the second operation unit 114, and may permit acceptance of the operation in the second operation unit 114 in a case where a predetermined operation is performed by the first occupant.

As described above, the display control unit 130 restricts change of display content with respect to the first display unit 170 by an operation of a person who sits in the assistant seat, and thus another display content is prevented from being displayed on the first display unit 170, for example, in a state in which a video associated with a rear-view mirror, a side-view mirror, or the like which is necessary for driving by an occupant is displayed on the first display unit 170.

FIGS. 4A to 4C are views showing an example of screen transition including a state in which one piece of content is displayed on the first display unit 170 and the second display unit 180. FIG. 4A associates with a state in which the fourth content is displayed on the first display unit 170, and the second content is displayed on the second display unit 180.

In this state, an operation of causing the first display unit 170 and the second display unit 180 to display fifth content (App(5)) is accepted in the operation region 172. For example, the operation is accepted in the operation region 172 and is not accepted in the operation region 182. That is, the operation is accepted only from a person who sits in the driver's seat. The display control unit 130 causes the first display unit 170 and the second display unit 180 to display the fifth content as one display unit on the basis of the operation that is accepted (refer to FIG. 4B). At this time, the display control unit 130 stops display of the fourth content and the second content or reduces a display region thereof.

In a state in which the fifth content is displayed on the first display unit 170 and the second display unit 180, an operation of selecting the sixth content and causing the first display unit 170 to display the sixth content is accepted in the operation region 172. In this case, the determination unit 120 determines that a sitting position of an occupant who performs the operation is the driver's seat. The display control unit 130 displays the sixth content in the image display region 174 of the first display unit 170 on the basis of a determination result by the determination unit 120 (refer to FIG. 4C). For example, the operation is accepted in the operation region 172, and is not accepted in the operation region 182. That is, the operation is accepted only from a person who sits in the driver's seat.

At this time, the display control unit 130 stops display of the fifth content or reduces a display region thereof. At this time, the display control unit 130 may reduce a display region of the fifth content, and may cause the second display unit 180 to display the fifth content.

Description has been given on the assumption that the operation of causing the first display unit 170 and the second display unit 180 to perform display as one display unit is basically accepted in the first operation unit 112 on the driver's seat side, and is not accepted in the second operation unit 114 on the passenger's side, but the operation may be accepted in the second operation unit 114 in correspondence with a travel state of the vehicle such as a state in which the vehicle stops for a long time.

In the state in which the sixth content is displayed on the first display unit 170, the display control unit 130 may cause the first display unit 170 and the second display unit 180 to display the sixth content in an enlarged manner on the basis of an operation.

Processing Flow

Figure 5:
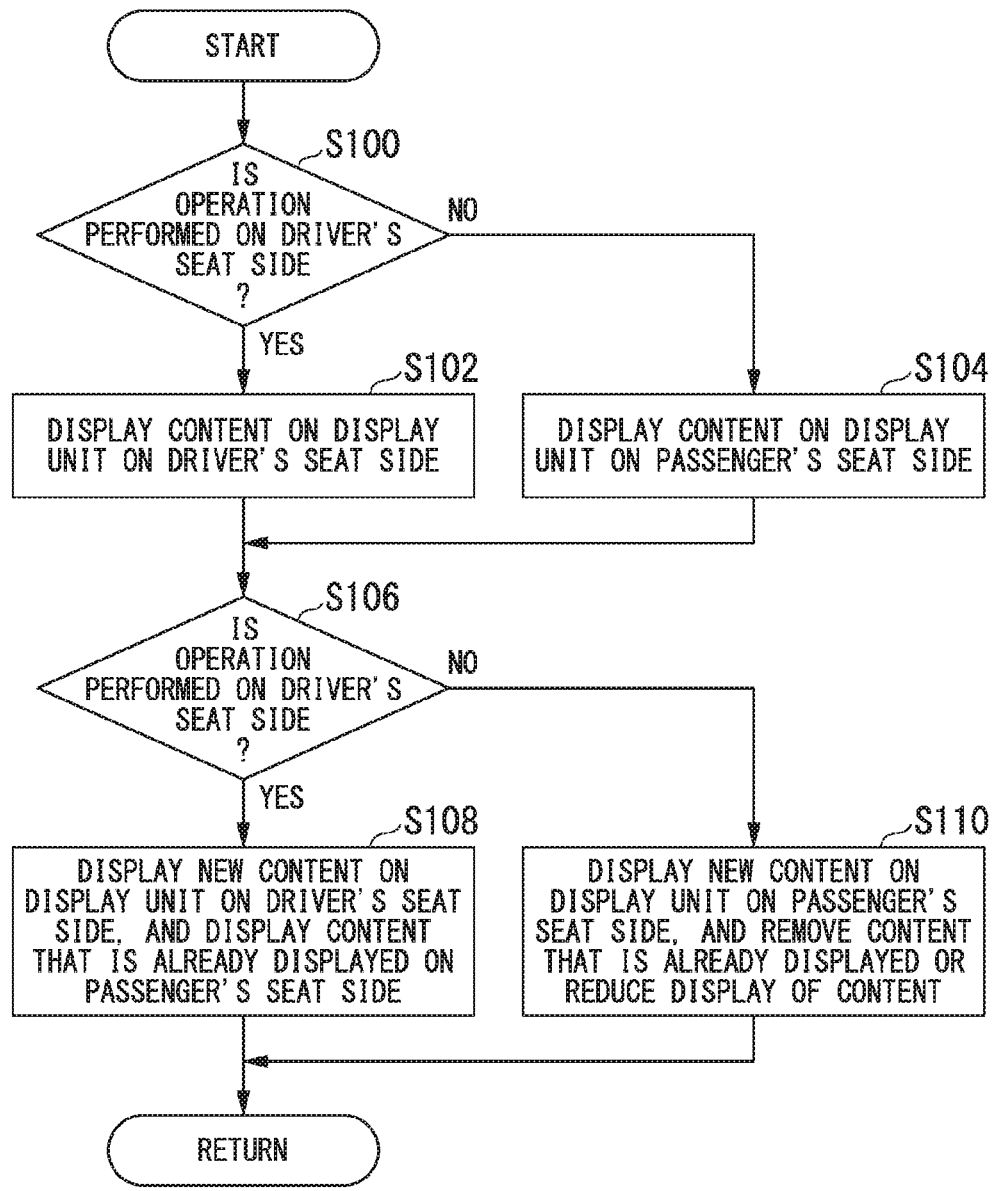
FIG. 5 is a flowchart showing an example of a flow of processing that is executed in the display device for a vehicle.

Next, description will be given of processing that is executed in the display device 100 for a vehicle. FIG. 5 is a flowchart showing an example of a flow of processing that is executed in the display device 100 for a vehicle. The following flowchart is executed after the power of the display device 100 for a vehicle is turned on. The determination unit 120 determines whether or not a sitting position of a person who performs an operation accepted from the operation unit 110 is a driver's seat (step S100).

In step S100, in a case where the sitting position is determined as the driver's seat, the display control unit 130 displays content on the first display unit 170 on the driver's seat side (step S102). In step S100, in a case where the sitting position is determined as the passenger's seat, the display control unit 130 displays content on the second display unit 180 on the passenger's seat side (step S104). Next, the determination unit 120 determines whether or not a sitting position of a person who performs an operation that is further accepted from the operation unit 110 is the driver's seat (step S106).

In step S106, in a case where the sitting position is determined as the driver's seat, the display control unit 130 displays new content on the first display unit 170 on the driver's seat side, and moves content that is already displayed on the first display unit 170 to the second display unit 180 (step S108). In step S106, in a case where the sitting position is determined as the passenger's seat, the display control unit 130 displays the new content on the second display unit 180 on the passenger's seat side, and stops content that is already displayed on the second display unit 180, or reduces display of the content (step S110). Then, the processing of the flowchart is terminated. The respective steps may be appropriately switched from each other, or may be appropriately omitted.

According to the above-described first embodiment, in the display device 100 for a vehicle, in a case that causing a plurality of display units to display content, content that is displayed by an operation of a driver is not changed by an operation of an occupant in the passenger's seat, and thus it is possible to improve convenience for the driver.

Second Embodiment

In the first embodiment, description has been given on the assumption that the determination unit 120 determines whether or not a sitting position of a person who performs an operation of the operation unit 110 is the driver's seat, and the display control unit 130 causes the first display unit 170 or the second display unit 180 to display content on the basis of a determination result. In the second embodiment, the display control unit 130 determines whether or not to cause the first display unit 170 or the second display unit 180 to display content on the basis of operation content that is accepted in the operation unit 110 without particularly determining the sitting position. In the following description, with regard to the same configuration as in the first embodiment, the same terminology and the same reference numeral will used, and redundant description thereof will be appropriately omitted.

Figure 6:
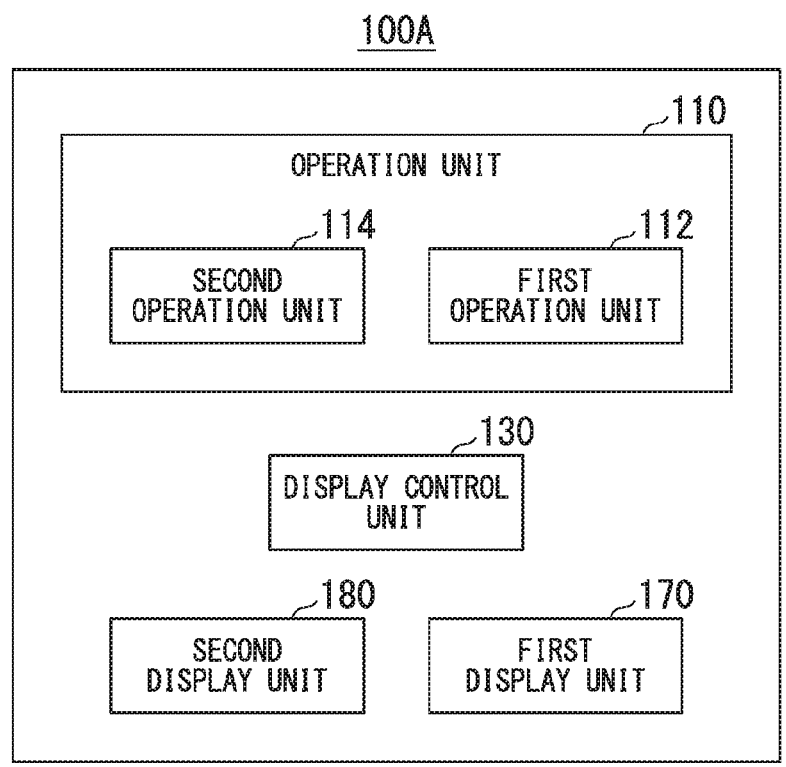
FIG. 6 is a block diagram showing a configuration of a display device for a vehicle according to a second embodiment.

FIG. 6 is a block diagram showing a configuration of a display device 100A for a vehicle according to the second embodiment. For example, the display device 100A for a vehicle includes an operation unit 110, a display control unit 130, a first display unit 170, and a second display unit 180. In addition, the operation unit 110 includes a first operation unit 112 and a second operation unit 114.

In the display device 100A for a vehicle, the display control unit 130 causes the first display unit 170 or the second display unit 180 to display content on the basis of operation content that is received in the operation unit 110 regardless of a determination result of a sitting position of an occupant by the determination unit 120 of the display device 100 for a vehicle according to the first embodiment.

For example, in a state in which content is displayed on any one of the first display unit 170 and the second display unit 180, an operation of performing display of new content is accepted in the operation unit 110. The display control unit 130 changes a display aspect of content that is already displayed in accordance with operation content of any one of an operation of performing display of new content which is accepted by the first operation unit 112 and an operation of performing display of new content which is accepted by the second operation unit 114.

For example, the display control unit 130 determines whether or not to restrict display of content that is already displayed on the basis of operation content in the operation unit 110, and causes any one or both of the first display unit 170 and the second display unit 180 to display new content.

First, description will be given of a case where an operation is accepted by the first operation unit 112. Hereinafter, description will be given with citation of FIGS. 2A to 2F, and FIGS. 4A to 4C in the first embodiment. A state shown in FIG. 2A is a state in which content is not displayed in the image display region 174 of the first display unit 170 and the image display region 184 of the second display unit 180. In a case where an operation of performing display of new content is accepted in the first operation unit 112 (the operation region 172), the display control unit 130 displays new first content in the image display region 174 (refer to FIG. 2B).

Next, in a state in which the first content is already displayed in the image display region 174, in a case where an operation of displaying new content is accepted by the operation region 172, the display control unit 130 does not restrict display content of the first content and moves the first content to the image display region 184 of the second display unit 180 (refer to FIG. 2C).

Next, in case where an operation of displaying new third content is further accepted by the operation region 172, the display control unit 130 displays the third content in the image display region 174 of the first display unit 170. At this time, the display control unit 130 moves second content to the image display region 184, and displays the second content in the image display region 184 (refer to FIG. 2D). In addition, the display control unit 130 stops display of the first content that is already displayed in the image display region 184, or reduces a display region of the first content. At this time, the display control unit 130 may allow the first content to operate in the background.

Next, in the operation region 172, an operation of switching display content of the image display region 174 and display content of the image display region 184 by the first occupant is accepted. In this case, the display control unit 130 allows display content of the image display region 174 and display content of the image display region 184 to be displayed after being switched from each other on the basis of the operation content accepted by the operation region 172, and thus the second content is displayed in the image display region 174, and the third content is displayed in the image display region 184 (refer to FIG. 2E).

Next, in a state in which the second content is displayed in the image display region 174, and the third content is displayed in the image display region 184, an operation of selecting new fourth content by the first occupant is accepted in the operation region 172. At this time, the display control unit 130 moves the second content that is displayed in the image display region 174 to the image display region 184 of the second display unit 180 on the basis of the operation content that is accepted in the operation region 172 (refer to FIG. 2F). In addition, the display control unit 130 stops display of the third content that is displayed in the image display region 184 or reduces a display region thereof.

At this time, the display control unit 130 may allow the third content to operate in the background. The display control unit 130 may allow the first content to operate in the background. With regard to the content that is allowed to operate in the background, an operation of stopping the content by the first occupant may be accepted in the operation region 172.

Next, description will be given of a case where an operation is accepted by the second operation unit 114. In a case where an operation is accepted by the second operation unit 114, the display control unit 130 causes the second display unit 180 to display new content, and does not cause the first display unit 170 to display the new content. For example, in a case where an operation is accepted by the second operation unit 114 in a state in which content is already displayed on the second display unit 180, the display control unit 130 stops display of the content that is already displayed on the second display unit 180 or reduces a display region thereof, or causes the second display unit 180 to display the new content.

In a case where an operation is accepted by the operation region 182, the display control unit 130 displays the new content in the image display region 184 so as not to have an influence on display content that is displayed on the basis of the operation accepted by the operation region 172. For example, in a case where content that is already displayed in the image display region 184 associates with the operation accepted by the operation region 172, the display control unit 130 does not accept an operation of displaying new content in the image display region 184 from the operation region 182.

Next, description will be given of processing by the display control unit 130 in a case where an operation is accepted in the second operation unit 114. First, it is assumed that sixth content is displayed on the first display unit 170 and no content is displayed on the second display unit 180 (refer to FIG. 3A). In this state, an operation of selecting first content is accepted in the operation region 182.

The display control unit 130 displays the first content in the image display region 184 on the basis of operation content in the operation region 182 (refer to FIG. 3B). The display control unit 130 does not have an influence on display content of the image display region 174 in accordance with the operation from the operation region 182.

In a state in which the first content is displayed on the second display unit 180, an operation of selecting the second content by the second occupant is accepted in the operation region 182. The display control unit 130 displays the second content in the image display region 184 of the second display unit 180 on the basis of operation content in the operation region 182 (refer to FIG. 3C).

At this time, the display control unit 130 does not move the first content that is already display on the second display unit 180 to the first display unit 170, and stops the display or reduces a display region.

It is assumed that fourth content is displayed on the first display unit 170 and the second content is displayed on the second display unit 180 (refer to FIG. 4A).

In this state, in the operation region 172, an operation of causing the first display unit 170 and the second display unit 180 to display fifth content is accepted. For example, the operation is accepted in the operation region 172 and is not accepted in the operation region 182. The display control unit 130 causes the first display unit 170 and the second display unit 180 to display the fifth content as one display unit on the basis of the operation that is accepted (refer to FIG. 4B). At this time, the display control unit 130 may stop display of the fourth content and the second content, or reduces a display region thereof.

In a state in which the fifth content is displayed on the first display unit 170 and the second display unit 180, an operation of causing the first display unit 170 to display the sixth content is accepted in the operation region 172. The display control unit 130 displays the sixth content in the image display region 174 of the first display unit 170 on the basis of the operation that is accepted in the operation region 172 (refer to FIG. 4C). For example, the operation is accepted in the operation region 172 and is not accepted in the operation region 182. That is, the operation is accepted only in the operation region 172.

At this time, the display control unit 130 stops display of the fifth content or reduces a display region thereof. At this time, the display control unit 130 may reduce the display region of the fifth content and may cause the second display unit 180 to display the fifth content.

Description has been given on the assumption that the operation of causing the first display unit 170 and the second display unit 180 to perform display as one display unit is basically accepted in the first operation unit 112 on the driver's seat side, and is not accepted in the second operation unit 114 on the passenger's side, but the operation may be accepted in the second operation unit 114 in correspondence with a travel state of the vehicle such as a state in which the vehicle stops for a long time.

In the state in which the sixth content is displayed on the first display unit 170, the display control unit 130 may cause the first display unit 170 and the second display unit 180 to display the sixth content in an enlarged manner on the basis of an operation.

Processing Flow

Figure 7:
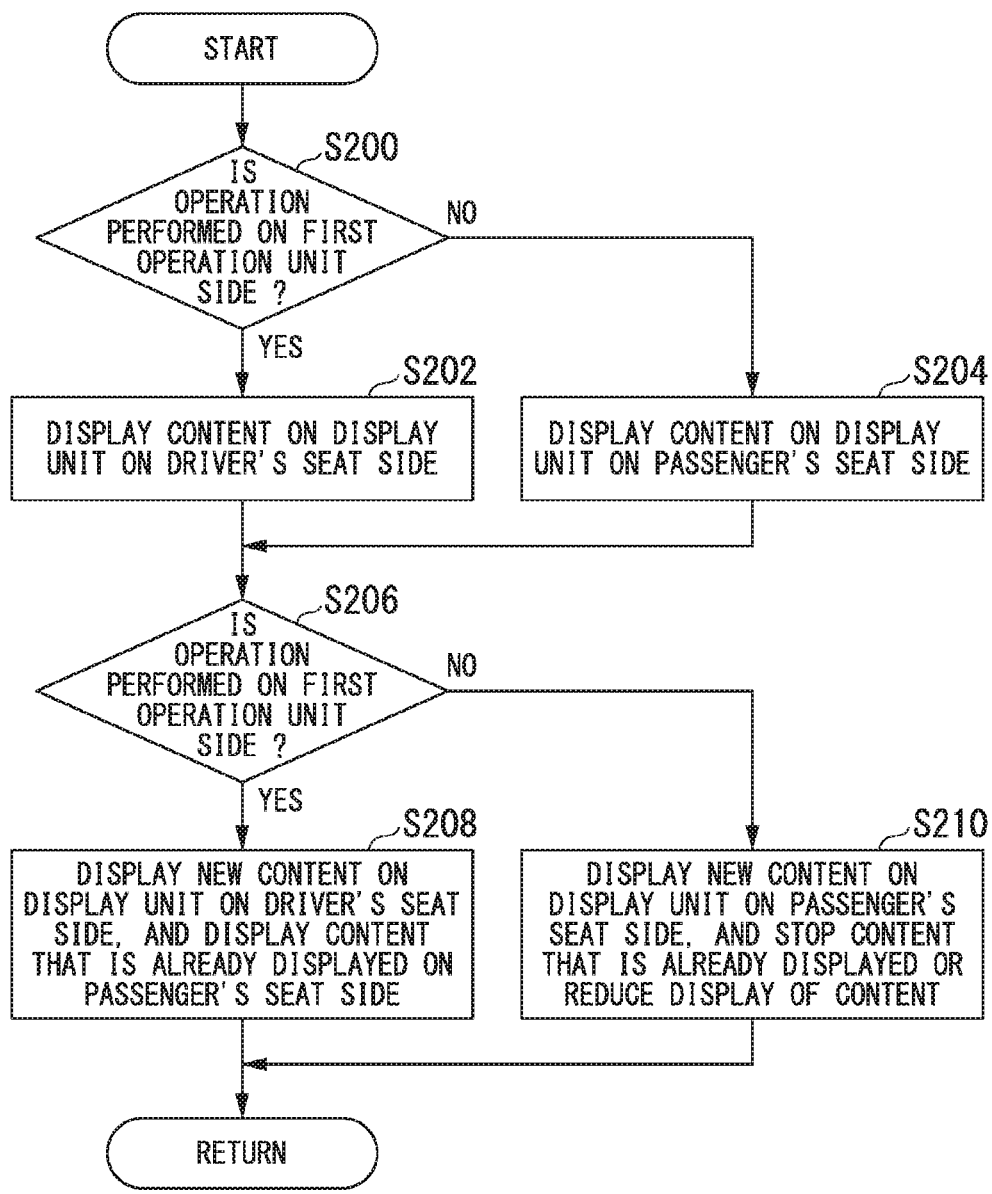
FIG. 7 is a flowchart showing an example of a flow of processing that is executed in the display device for a vehicle.

Next, description will be given of processing that is executed in the display device 100A for a vehicle. FIG. 7 is a flowchart showing an example of a flow of processing that is executed in the display device 100A for a vehicle according to the second embodiment. The following flowchart is executed after the power of the display device 100A for a vehicle is turned on. The display control unit 130 determines whether an operation is accepted by the first operation unit 112 or whether the operation is accepted by the second operation unit 114 (step S200).

In step S200, in a case where it is determined that the operation is accepted by the first operation unit 112, the display control unit 130 displays content on the first display unit 170 on the driver's seat side (step S202). In step S200, in a case where it is determined that the operation is accepted by the second operation unit 114, the display control unit 130 display the content on the second display unit 180 on the passenger's seat side (step S204). Next, the display control unit 130 determines whether an operation is accepted by the first operation unit 112 or whether the operation is accepted by the second operation unit 114 (step S206).

In step S206, in a case where it is determined that the operation is accepted by the first operation unit 112, the display control unit 130 displays new content on the first display unit 170 on the driver's seat side and moves content that is already displayed on the first display unit 170 to the second display unit 180 (step S208).

In step S206, in a case where it is determined that the operation is accepted by the second operation unit 114, the display control unit 130 displays new content on the second display unit 180 on the passenger's seat side, and stops content that is already displayed on the second display unit 180 or reduces display of the content (step S210). Then, the processing of the flowchart is terminated. The respective steps may be appropriately switched from each other, or may be appropriately omitted.

According to the second embodiment, the display device 100A for a vehicle changes a display aspect in a plurality of display units in correspondence with operation content that is accepted in the operation unit 110, and thus it is not necessary to determine a sitting position of an occupant. As a result, it is possible to simplify processing.

Other Modification Examples

In a case where display units are constructed as one screen, a division ratio of display regions may be arbitrarily changed in accordance with acception of an operation by the first occupant. For example, the division ratio of the display regions may be arbitrarily set in accordance with an operation that touches the one screen. In this case, a display region on the driver's seat side can be enlarged, but a display region on the passenger's seat side may be restricted not to exceed the half or greater.

The display control unit 130 may store a display aspect that is set by a user in correspondence with content in a storage unit, and may cause a display unit to display the previous display aspect on the basis of information stored in the storage unit in a case that displaying the content at the next time. The display control unit 130 may learn preference of a display aspect that is set by a user in correspondence with content, and may display the content in the display aspect conforming to the preference of the user.

The first operation unit 112 and the second operation unit 114 may be provided as a mechanical switch in addition to a configuration that is displayed on a screen of a touch panel. In this case, the first operation unit 112 may be provided adjacent to the first display unit 170, or may be provided at a position (for example, a handle, a door, a position in the vicinity of the door, and the like) that is separated from the first display unit 170 and can be operated by the first occupant, but is hard to be operated by the second occupant. Similarly, the second operation unit 114 may be provided adjacent to the second display unit 180, or may be provided at a position that is separated from the second display unit 180 and can be operated by the second occupant, but is hard to be operated by the first occupant.

The first display unit 170 and the second display unit 180 may be applied to a head-up display (HUD) that is displayed on a windshield, a projector that projects content to the inside of a vehicle, a display that is embedded in a rear-view mirror, and the like in addition to the touch panel.

In a case where the first display unit 170 and the second display unit 180 are configured as the head-up display, in a case that changing a display aspect of content that is already displayed, the display control unit 130 may perform display of the content that is already displayed in a three-dimensional manner to be visually recognized on a distant side in comparison to content that is newly displayed.

In a case where a camera is provided at the inside of a vehicle, the determination unit 120 may estimate a sitting position of a person who operates the operation unit 110 on the basis of a recognition result of an image that is captured by the camera. For example, the determination unit 120 may extract a person in an image on the basis of a luminance difference between images captured by the camera, may compare the images in a predetermined sampling interval to recognize an operation of the person, and may compare an operation acception result of the operation unit 110 and the operation of the person to determine who has performed the operation between a person who sits in the driver's seat and a person who sits in the passenger's seat.

When an operation of the touch panel is performed, the determination unit 120 may perform biological authentication such as finger print authentication to specify a person who performs the operation, and may determine who has performed the operation between the person who sits in the driver's seat and the person who sits in the passenger's seat.

In a case where the operation unit 110 is configured as one operation unit including a remote controller, the determination unit 120 or the display control unit 130 may determine who has performed the operation between the person who sits in the driver's seat and the person who sits in the passenger's seat on the basis of the recognition result by the camera or the biological authentication result by the touch panel. In a case where the operation unit 110 is configured as one operation unit including a remote controller, an operation by a driver or an operation by a person other than the driver may be selected by an operation, and the display control unit 130 may cause the first display unit 170 or the second display unit 180 to display content on the basis of the selection result.

According to the above-described embodiments, in the display devices 100 and 100A for a vehicle, in a case where a plurality of display units are mounted in the vehicle, it is possible to improve convenience for a driver by causing a display aspect to vary flexibly. The display device 100 for a vehicle does not change a display aspect of content that is displayed on a display unit on the driver's seat side even in a case that accepting an operation by an occupant in the passenger's seat side, and thus it is possible to prevent information necessary for an occupant in the driver's seat side from not being displayed.

Hardware Configuration

Figure 8:
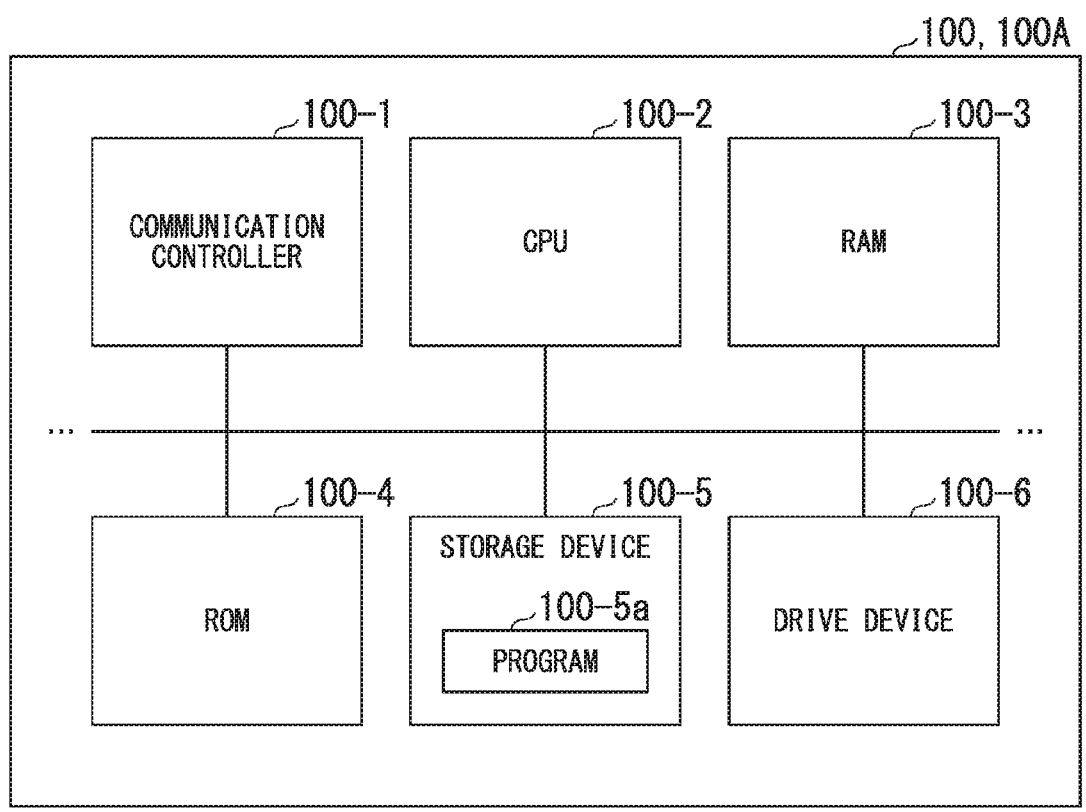
FIG. 8 is a view showing an example of a hardware configuration of the display device for a vehicle.

FIG. 8 is a view showing an example of a hardware configuration of the display devices 100 and 100A for a vehicle.

As shown in the drawing, the display device 100 for a vehicle according to the embodiment has a configuration in which a communication controller 100-1, a CPU 100-2, a random access memory (RAM) 100-3 that is used as a working memory, a read only memory (ROM) 100-4 that stores a boot program and the like, a storage device 100-5 such as a flash memory and a hard disk drive (HDD), a drive device 100-6, and the like are connected to each other through an internal bus or a dedicated communication line. The communication controller 100-1 performs communication with other constituent elements other than the display device 100 for a vehicle. A program 100-5a that is executed by the CPU 100-2 is stored in the storage device 100-5. The program is developed in the RAM 100-3 by a direct memory access (DMA) controller (not shown) and the like, and is executed by the CPU 100-2. According to this, some or all of the operation unit, the determination unit, and the display control units are realized.

The above-described first embodiment can be expressed as follows.

A display device for a vehicle, including:

a storage device that stores a program; and a hardware processor, wherein the hardware processor executes the program that is stored in the storage device, to accept an operation of selecting content that is to be displayed on some or all of a plurality of display units which are mounted in the vehicle, to determine a sitting position of a person who performs the operation, to display content on any one of the plurality of display units on the basis of an operation that is accepted, and a determination result of the sitting position, and to change a display aspect of content that is already displayed on the basis of the determination result of the sitting position in a case of accepting an operation of performing display of new content by the operation in a state in which the content is displayed on any one of the plurality of display units.

In addition, the above-described second embodiment can be expressed as follows.

A display device for a vehicle, including:

a storage device that stores a program; and a hardware processor, wherein the hardware processor executes the program that is stored in the storage device, to accept an operation in an operation unit that includes a first operation unit on a driver's seat side and a second operation unit on a passenger's seat side which accept an operation of selecting content that is to be displayed on some or all of a plurality of display units which are mounted in the vehicle, to display content on any one of the plurality of display units on the basis of an operation that is accepted, and to change a display aspect of content that is already displayed in correspondence with operation content of any one of an operation of performing display of new content which is accepted by the first operation unit and an operation of performing display of new content which is accepted by the second operation unit in a state in which content is displayed on any one of the plurality of display units.

Hereinbefore, description has been given of modes for carrying out the invention with reference to embodiments. However, the invention is not limited to the embodiments, and various modifications and substitutions can be made within a range not departing from the gist of the invention. For example, in the embodiments, a configuration of causing two display units to display content. However, the invention is not limited thereto, and is applicable to a configuration in which three or more display units are provided.

What is claimed is:

1. A display device for a vehicle, comprising:
a plurality of display units which are mounted in the vehicle;
an operation unit that is configured to accept an operation of selecting content that is to be displayed on some or all of the plurality of display units;
a determination unit that is configured to determine a sitting position of a person who operates the operation unit; and
a display control unit that is configured to cause any one of the plurality of display units to display content on the basis of an operation that is accepted by the operation unit and a determination result of the determination unit,
wherein the plurality of display units are configured to include a first display unit that is disposed on a driver's seat side and a second display unit that is disposed closer to a passenger's seat side than the first display unit,
the first display unit is configured to include a first image display region and a first operation region that is disposed closer to the driver's seat side than the first display unit,
the second display unit is configured to include a second image display region and a second operation region that is disposed closer to the passenger's seat side than the second display unit,
the operation unit accepts an operation by the first operation region and the second operation region are being operated,
in a case the first operation region is operated, the determination unit determines the sitting position of the person who operates is the driver's seat,
in a case the second operation region is operated, the determination unit determines the sitting position of the person who operates is the passenger's seat, and
in a state in which content is displayed on any one of the plurality of display units, in a case where an operation of performing display of new content is accepted by the operation unit, the display control unit is configured to change a display aspect of the content that is already displayed on the basis of a determination result of the sitting position by the determination unit.

2. The display device for a vehicle according to claim 1, wherein the plurality of display units are constructed by dividing a display region on one screen, and
in a state in which content is displayed on any one of the plurality of display units, in a case where an operation of performing display of new content is accepted by the operation unit, the display control unit is configured to determine whether or not to perform display by changing a display region of the content that is already displayed on the basis of a determined result of the determination unit.

3. The display device for a vehicle according to claim 1, wherein learn preference of a display aspect that is set by a user in correspondence with the content, and display the content in the display aspect conforming to the preference of the user.

4. The display device for a vehicle according to claim 1, wherein
in a state in which content is displayed on any one of the first display unit and the second display unit, in a case where an operation of performing display of new content is accepted by the operation unit, the display control unit is configured to determine whether or not to move the content that is already displayed between the display units on the basis of a determination result by the determination unit.

5. The display device for a vehicle according to claim 4, wherein in a state in which content is displayed on any one of the first display unit and the second display unit, in a case where an operation of performing display of new content is accepted by the operation unit,
the display control unit is configured to move the content that is already displayed on the first display unit from the first display unit to the second display unit in a case where the determination unit determines that the sitting position is the driver's seat, and
the display control unit is configured not to move the content that is already displayed on the second display unit from the second display unit to the first display unit in a case where the determination unit is configured to determine that the sitting position is the passenger's seat.

6. The display device for a vehicle according to claim 1, wherein
the determination unit is configured to determine whether the sitting position of the person who operates the operation unit is the driver's seat or the passenger's seat, and
in a state in which content is displayed on any one of the first display unit and the second display unit, in a case where an operation of performing display of new content is accepted by the operation unit, the display control unit is configured to determine whether or not to restrict display of the content that is already displayed on the basis of a determination result by the determination unit.

7. The display device for a vehicle according to claim 6, wherein in a state in which content is displayed on any one of the first display unit and the second display unit, in a case where an operation of performing display of new content is accepted by the operation unit,
the display control unit is configured not to restrict display of the content that is already displayed on the first display unit in a case where the determined unit is configured to determine that the sitting position is the driver's seat, and the display control unit is configured to stop display of the content that is already displayed on the second display unit or reduces a display region in a case where the determination unit is configured to determine that the sitting position is the passenger's seat.

8. The display device for a vehicle according to claim 1, wherein in a case where an operation of causing the plurality of display units to display one piece of content is accepted in the operation unit, the display control unit is configured to cause the plurality of display units to display the one piece of content as one display unit.

9. The display device for a vehicle according to claim 8, wherein the operation of causing the plurality of display units to display the one piece of content is accepted only from an operation by the first operation region in the operation unit.

10. The display device for a vehicle according to claim 8, wherein in a state in which the one piece of content is displayed on the plurality of display units as one display unit, in a case of accepting an operation of displaying new content on some display units among the plurality of display units, the display control unit is configured to stop display of the one piece of content or reduces a display region, and displays the new content on the some display units.

11. The display device for a vehicle according to claim 10, wherein the operation of displaying new content on some display units among the plurality of display units is accepted only from an operation by the first operation region.

12. A display device for a vehicle, comprising:

a plurality of display units which are mounted in the vehicle;

an operation unit including a first operation unit on a driver's seat side and a second operation unit on a passenger's seat side, the first and second operation units accepting an operation of selecting content that is to be displayed on some or all of the plurality of display units; and a display control unit that is configured to cause any one of the plurality of display units to display content on the basis of an operation that is accepted by the operation unit, wherein the plurality of display units are configured to include a first display unit that is disposed on a driver's seat side and a second display unit that is disposed closer to a passenger's seat side than the first display unit, the first display unit is configured to include a first image display region and a first operation region that is disposed closer to the driver's seat side than the first display unit, the second display unit is configured to include a second image display region and a second operation region that is disposed closer to the passenger's seat side than the second display unit, the operation unit accepts an operation by the first operation region and the second operation region are being operated, and in a state in which content is displayed on any one of the plurality of display units, the display control unit is configured to change a display aspect of the content that is already displayed in correspondence with operation content of any one of an operation of performing display of content which is accepted by the first operation unit and an operation of performing display of content which is accepted by the second operation unit.

13. The display device for a vehicle according to claim 12, wherein the plurality of display units are constructed by dividing a display region on one screen, and in a state in which content is displayed on any one of the plurality of display units, in a case where an operation of performing display of new content is accepted by the operation unit, the display control unit is configured to determine whether or not to perform display by changing a display region of the content that is already displayed on the basis of the operation content.

14. The display device for a vehicle according to claim 12, wherein learn preference of a display aspect that is set by a user in correspondence with the content, and display the content in the display aspect conforming to the preference of the user.

15. The display device for a vehicle according to claim 12, wherein in a state in which content is displayed on any one of the first display unit and the second display unit, in a case where an operation of performing display of new content is accepted by the operation unit, the display control unit is configured to determine whether or not to move the content that is already displayed between the display units on the basis of the operation content.

16. The display device for a vehicle according to claim 15, wherein in a state in which content is displayed on any one of the first display unit and the second display unit, in a case where an operation of performing display of new content is accepted by the operation unit, the display control unit is configured to move the content that is already displayed on the first display unit from the first display unit to the second display unit in a case where the operation is accepted in the first operation unit, and the display control unit is configured not to move the content that is already displayed on the second display unit from the second display unit to the first display unit in a case where the operation is accepted in the second operation unit.

17. The display device for a vehicle according to claim 12, wherein in a state in which content is displayed on any one of the first display unit and the second display unit, in a case where an operation of performing display of new content is accepted by the operation unit, the display control unit is configured to determine whether or not to restrict display of the content that is already displayed on the basis of the operation content.

18. The display device for a vehicle according to claim 17, wherein in a state in which content is displayed on any one of the first display unit and the second display unit, in a case where an operation of performing display of new content is accepted by the operation unit, the display control unit is configured to not to restrict display of the content that is already displayed on the first display unit in a case where the operation is accepted by the first operation unit, and the display control unit is configured to stop display of the content that is already displayed on the second display unit or reduces a display region in a case where the operation is accepted by the second operation unit.

19. The display device for a vehicle according to claim 12, wherein in a case where an operation of causing the plurality of display units to display one piece of content is accepted in the operation unit, the display control unit is configured to cause the plurality of display units to display the one piece of content as one display unit.

20. The display device for a vehicle according to claim 19, wherein the operation of causing the plurality of display units to display the one piece of content is accepted only by the first operation unit.

21. The display device for a vehicle according to claim 19, wherein in a state in which the one piece of content is displayed on the plurality of display units as one display unit, in a case of accepting an operation of displaying new content on some display units among the plurality of display units, the display control unit is configured to stop display of the one piece of content or reduces a display region, and displays the new content on the some display units.

22. The display device for a vehicle according to claim 21, wherein the operation of displaying new content on some display units among the plurality of display units is accepted only by the first operation unit.

* * * * *